United States Patent [19]

Botsolas

[11] Patent Number: 4,669,509

[45] Date of Patent: Jun. 2, 1987

[54] PIPE INSULATION FITTING COVER AND FASTENING MEANS AND METHODS OF USING THE SAME

[75] Inventor: Chris J. Botsolas, St. Petersburg, Fla.

[73] Assignee: Carol Botsolas, St. Petersburg, Fla.

[21] Appl. No.: 869,389

[22] Filed: May 30, 1986

[51] Int. Cl.⁴ ............................................. F16L 57/00
[52] U.S. Cl. ....................................... 138/178; 138/99;
        138/110; 138/167; 138/149; 285/45
[58] Field of Search ........................... 285/45, 293, 419;
        138/178, 110, 99, 149, 156, 167; 411/461

[56] References Cited

U.S. PATENT DOCUMENTS

| | | | |
|---|---|---|---|
| 1,329,268 | 1/1920 | Dickelmann et al. | 411/461 |
| 2,126,585 | 8/1938 | Stone | 411/455 |
| 2,700,988 | 2/1955 | Smisko | 285/45 X |
| 2,946,371 | 7/1960 | Stephens et al. | 138/167 X |
| 3,333,500 | 8/1967 | Kelsay | 411/461 |
| 3,495,629 | 2/1970 | Botsolas et al. | 138/178 X |
| 3,960,180 | 6/1976 | Andersson | 138/149 X |
| 3,960,181 | 6/1976 | Baur et al. | 285/45 X |
| 4,139,026 | 2/1979 | Zack | 285/45 X |
| 4,463,780 | 8/1984 | Schultz et al. | 138/156 |
| 4,554,773 | 11/1985 | Conley | 411/461 X |

FOREIGN PATENT DOCUMENTS 725513  1/1966  Canada .................................. 285/293

Primary Examiner—Thomas F. Callaghan
Attorney, Agent, or Firm—Hedman, Gibson, Costigan & Hoare

[57] ABSTRACT

Disclosed is a pipe fitting cover for angled pipe joints formed of a single integral structure in which the opposed ends of the structure are secured about the angled pipe joint by a single securing means in the central portion of the topmost opposed end and wherein the top end may have an arcuate edge to provide a smoother overlap of the top end and bottom end. Also disclosed is a novel securing means for securing the cover about the angled pipe joint and a method of securing the cover about the angled pipe joint.

15 Claims, 12 Drawing Figures

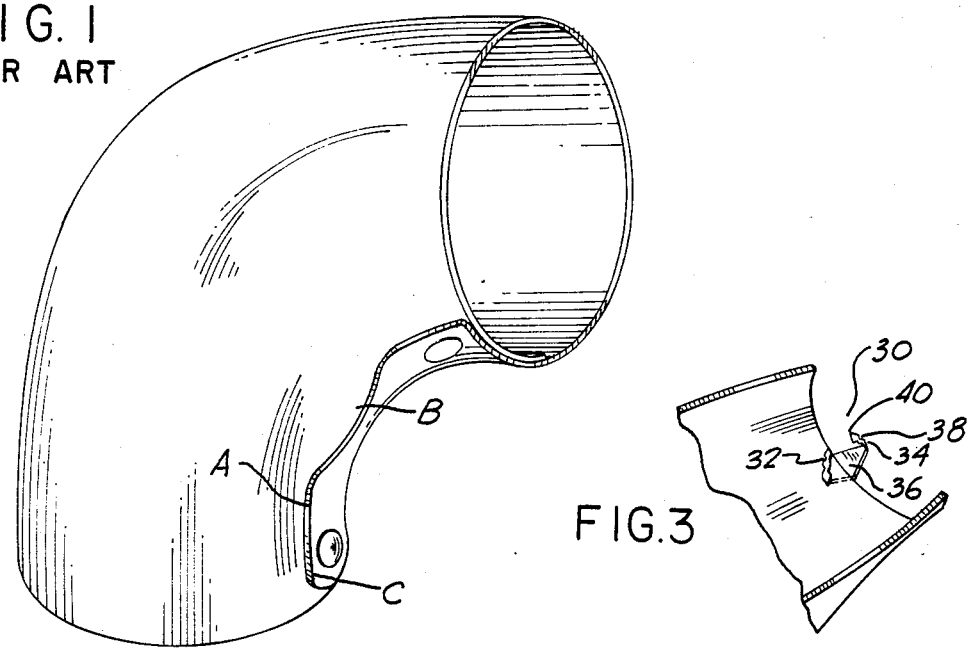
FIG. 1 PRIOR ART
FIG. 3
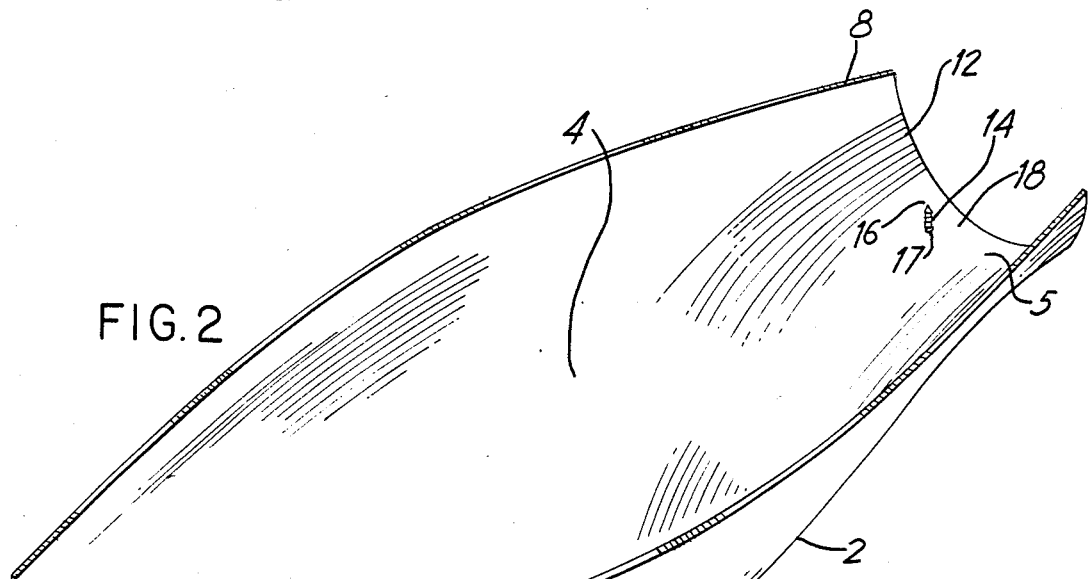
FIG. 2
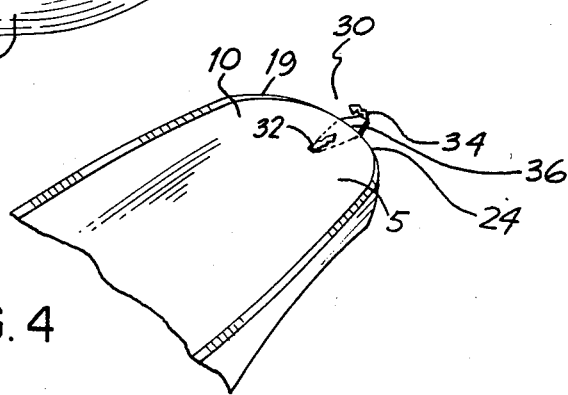
FIG. 4

PIPE INSULATION FITTING COVER AND FASTENING MEANS AND METHODS OF USING THE SAME

FIELD OF THE INVENTION

The present invention is directed to a novel pipe fitting cover for covering an angled pipe joint, to methods of covering the angled pipe joint using the novel pipe fitting cover and to novel fastening means for securing the cover about the angled pipe joint.

BACKGROUND OF THE INVENTION

Pipe fitting covers for angled joints such as elbow joints, tee joints, etc. are known in the art. For example, Dunn, U.S. Pat. No. 3,153,546 discloses a split jacket housing for pipe elbows having sections with overlapping connecting flanges and interengageable ribs and grooves. Carlson, U.S. Pat. No. 3,307,590 discloses semi-circular foamed urethane sections surrounded by aluminum shell segments.

Pipe fitting covers of the type mentioned above being formed from a pair of semi-circular sections are disadvantageous because they have seams which may split or crack and thereby eventually leak. Unless the pipe insulation, especially at an angled pipe joint is tightly sealed, the pipe insulation customarily used around the pipe can fail due to moisture intrusion, causing undesired energy loss. The pipe system itself may also fail due to corrosion arising from the infiltration of moisture under the jacketing surrounding the insulation.

More recently, with the development of thermoplastics and other flexible resilient materials, pipe covers have been constructed as one piece units to eliminate the seams of sectioned covers. The single piece units are formed as a single integral structure having opposed ends which are folded about each other around the inner radius of the angled joint when the cover is wrapped therearound. As used herein, the term "angled joint" means any juncture of at least two pipes which come together at an angle with respect to each other. The most common examples are elbow joints and tee joints (pipes that meet at a 90° angle).

Such single piece covers have been made by Proto Corporation, Zeston, Inc. and Speedline Manufacturing Company. In order to secure the cover about the angled joint, the opposed ends are folded over each other and secured together and to the underlying pipe insulation. Common means of securing the opposed ends together are adhesives or a pair of threaded tacks which are inserted into the opposed corners of the top end of the cover and then inserted into a corresponding portion of the bottom end.

These methods, however, have had limited success. Adhesives are disadvantageous because the opposed ends tend to separate from each other especially when the adhesive cracks due to the often severe temperature and humidity conditions in vicinity of the pipe joint. There are also major disadvantages with the two tack attachment system. First, the threaded tacks typically used are expensive and each tack may comprise as much as 15% of the total cost of the cover. It would therefore be desirable to eliminate one of the tacks used to secure the cover about the angled joint. Second, the area of the top end of the cover between the two tacks has a tendency to buckle when the tacks are inserted through the top end and bottom end. As a result, the area of the cover between the two tacks does not close as tightly as is necessary to eliminate the elements leading to the failure of the pipe insulation and the pipe itself.

There is a need in the pipe insulation industry to provide a pipe cover which is tightly secured about an angled joint and thereby overcomes the problems of previously employed pipe cover systems.

It is therefore an object of the present invention to provide a single integral structure pipe cover for covering an angled joint such as an elbow joint, tee joint, etc. which provides greater protection against moisture infiltration, is easier to install and significantly less expensive to produce than known pipe covers.

It is a further object of the invention to provide a novel fastening means to secure a single integral structure pipe cover about an angled joint which avoids the use of multiple fastening means to fasten the cover around an angled joint.

It is another object of the invention to provide a single integral structure pipe cover wherein the terminal edge of the top end of the cover has an arcuate shape so that the top end lies flat against the bottom end of the cover to thereby prevent moisture infiltration.

It is a further object of the invention to provide a method of securing a pipe cover about an angled joint with the use of a single centrally located securing means.

SUMMARY OF THE INVENTION

The present invention is directed to pipe fitting covers for covering an angled pipe joint, such as an elbow joint, tee joint, etc. The cover is formed from a flexible resilient material such as a thermoplastic, preferably polyvinylchloride. The resilient material is formed as a single integral structure in a first elongated trough-like shape having opposed ends. One end is folded over the other end to form a top end and a bottom end and when the cover is placed about the angled joint such that the trough of the cover assumes the shape of the outside surface of the angled joint, and the top and bottom ends are wrapped about the inner radius of the angled joint.

The top end of the cover has in the central portion thereof means for securing the top end to the bottom end when the pipe cover is in the operable position wrapped around the angled joint. In one embodiment of the invention the securing means comprises a novel fastener having at least two spaced apart arms, one of the arms is engaged by the central portion of the top end and another of the arms is adapted to be inserted through the bottom end when the pipe cover is wrapped around the angled joint.

In another embodiment of the invention the securing means is a threaded tack which has an end for piercing the flexible material and the threads are of sufficient width so that the tack is retained in the hole made by the piercing end of the tack.

Regardless of which securing means is used in accordance with the invention, it is preferred that top end be comprised of an arcuate shaped terminal edge forming an apex in the central portion of the top end. For example, the threaded tack is inserted through the apex of the central portion of the top end. When the cover is to be installed around the angled joint, the threaded tack is then inserted through the bottom end to secure the cover about the angled pipe joint. The arcuate shaped terminal edge of the top end results in the overlapping top end lying flat against the bottom end making it significantly easier to install the cover and to prevent moisture infiltration.

The novel fastening means of the invention is employed in a similar manner. Specifically, one arm of the fastener is caused to engage the top end of the cover. This is accomplished by inserting the arm through the top end and bending it back so that the arm is pressed against the underside of the top end. It is also possible to merely insert the arm straight through the top end as is done with the threaded tack. The fastener also has at least one other arm which is adapted to be inserted through the bottom end.

With both securing means described herein, the top and bottom ends of the cover are held in overlapping relationship so that the pipe cover is secured about the angled pipe joint.

In order to maximize the overlap of the top and bottom ends of the cover about the angled pipe joint, it is preferred to insert the securing means into the bottom end at an acute angle with respect to the plane of the bottom end. This is accomplished when using the threaded tack by driving the threaded tack through the bottom end at an acute angle and then pushing downward until the threaded tack is secure in the bottom end.

To achieve the same result with the fastener, the arm of the fastener which enters the bottom end is constructed such that the arm extends from the base of the fastener at an acute angle. Since the base of the fastener and the plane of the bottom end are essentially parallel, the acute angle arm will also enter the bottom end at an acute angle.

As a result of penetration at an acute angle into the bottom end of the cover, the securing means of the invention acts as a lever to draw the top end more tightly over the bottom end to thereby provide a tighter more secure fit of the cover about the angled pipe joint.

Thermoplastics, such as polyvinyl chloride have a tendency to retain the shape in which they are molded. Accordingly, from the point of view of providing easier installation of the cover about the angled pipe joint, it is preferred to mold the flexible resilient material in a trough-like shape which closely resembles the shape of the angled pipe joint. That is, the trough-like structure is preferably molded so that the outside surface of the structure has substantially the same shape as the outside surface of the angled pipe joint (e.g., the outside radius of an elbow joint)as described in Botsolas, U.S. Pat. No. 3,495,629 incorporated herein by reference. In this way, the cover rests around the angled pipe joint while the installer secures the top end to the bottom end about the inner radius of the angled pipe joint.

In operation, the pipe cover, having a single securing means such as the threaded tack or novel fastener described above affixed to the central portion of the top end, is placed around the angled pipe joint so that the outer surface of the trough is aligned with the outer surface of the angled pipe joint. The bottom end is wrapped around the inner radius of the angled pipe joint and the top end is placed in overlapping relationship about the bottom end. The tack or fastener is then inserted through the bottom end to thereby secure the top and bottom ends tightly together and the cover about the angled pipe joint.

BRIEF DESCRIPTION OF THE DRAWINGS

The following is a detailed description together with accompanying drawings of illustrative embodiments of the invention. It is to be understood that the invention is capable of modification and variation apparent to those skilled in the art within the spirit and scope invention.

FIG. 1 is a perspective view of an elbow pipe cover of the prior art;

FIG. 2 is a perspective view of a trough shaped structure in accordance with the present invention ready to assume the shape of an elbow cover wherein the top end has a threaded tack inserted through the central portion thereof;

FIG. 3 is a partial perspective view of the same structure shown in FIG. 2 except that a fastener of the present invention is shown having one arm attached to the top end and a second arm free to be inserted into the bottom end of the cover;

FIG. 4 is a partial perspective view as shown in FIG. 3 except that the top end has an arcuate shaped terminal edge and the fastener is folded over against the inside surface of the top end;

DETAILED DESCRIPTION OF THE DRAWINGS

Figure 5:
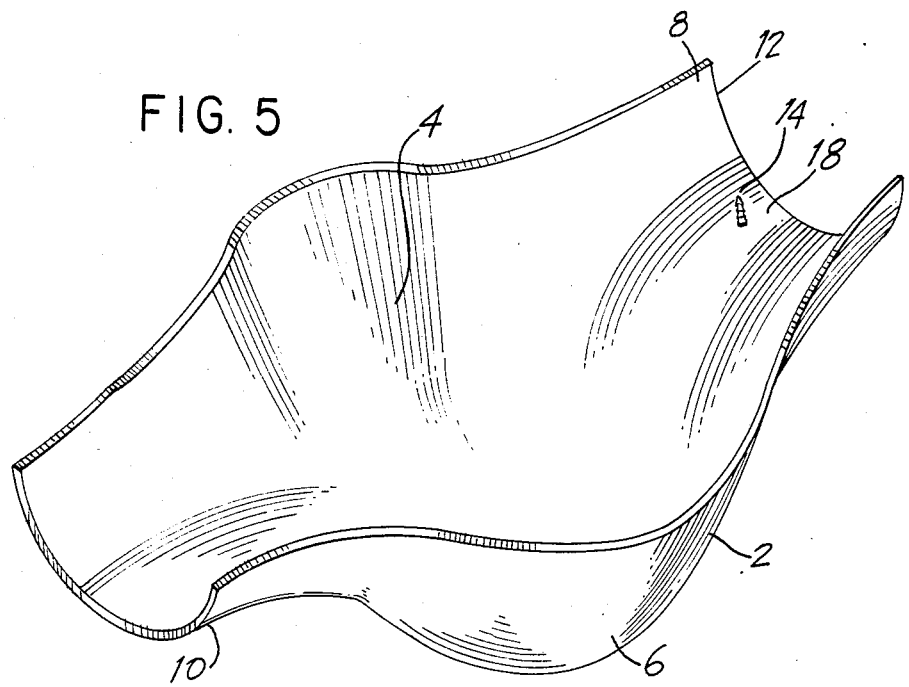
FIG. 5 is a perspective view of another embodiment of the trough shaped structure wherein the shape of the trough is substantially the same as the outer radius of an elbow joint.

As previously indicated others have made and sold thermoplastic angled pipe joint covers in the form of a single integral structure wherein one end is folded over another end about the inner radius of the pipe joint and both ends are secured by a pair of tacks as shown in FIG. 1. In the prior art device, the terminal edge of the top end is straight.

As further shown in FIG. 1, the two tack arrangement of the prior art often results in buckling of the top end in the area designated by the letter "B" between the two tacks. Furthermore, it is not uncommon for the area ("C") of the top end lying away from the tacks towards the side edges to fold upwards during use. This results in potential leakage areas around the angled pipe joint which are eliminated by the present invention.

Referring to FIG. 2 there is shown an angled pipe cover, specifically a pipe elbow cover 2 formed as a single integral structure having a trough 4 having an outer surface 6 formed between a first end 8 and second end 10. The first end 8 has a terminal edge 12, which may, as shown, for example, in FIGS. 6 and 7 and described hereinafter, have an arcuate shape. In the embodiment shown in FIG. 2, a securing means in the form of a threaded tack 14 having a piercing end 16 and annular threads 17 inserted through a central portion 18 of the first end 8.

In order to place the cover 2 about the elbow joint, the trough 4 is placed on the outside radius of the elbow joint and the second end 10 is brought around the inner radius of the elbow joint. The first end 8 having therethrough the threaded tack 14 is then brought around and over the second end 10 in overlapping relationship.

The piercing end 16 of the threaded tack 14 (see FIG. 8) penetrates into the second end 10 when pressure is applied to the head 15 (see FIG. 8A) of the threaded tack 14, preferably at an acute angle with respect to the plane of the second end 10 when the second end 10 is in the operable position beneath the first end 8 and the cover 2 is wrapped around the elbow joint.

Figure 10:
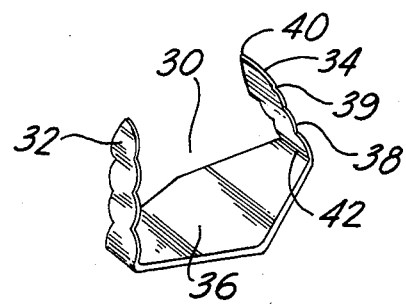
FIG. 10 is a perspective view of the fastener of the present invention with one arm extending from the base at an acute angle.

As shown in FIG. 10, the securing means may be in the form of a fastener 30 having a first arm 32 for insertion into the first end 8 and a second arm 34 for penetrating into the second end 10 of the cover 2 and a base 36 therebetween. The second arm 34 comprises a tapered body 38 terminating at end 40 which can easily penetrate the cover 2 under pressure applied to the base 36. The tapered body 38 has ridges 39 which secure the second arm 34 in the hole made in the first end 8 of the cover. It is preferred to have the second arm 34 extending from the base 36 of the fastener 30 at an acute angle as shown by the numeral 42 so that second arm 34 penetrates into the second end 10 of the cover 2 at an acute angle because the fastener 30 and the plane of the second end 10 are essentially parallel to each other.

The first arm 32 is constructed in a similar manner to the second arm 34 with respect to the tapered body, penetrating end and cover engaging ridges. It is not necessary for the first arm 32 to extend from the base 36 at an acute angle. As shown in FIG. 3 the second arm 32 penetrates through the first end 8 and the second arm 34 is in position to penetrate the second end 10 when the cover 2 is placed in the operable position about the angled pipe joint. The ridges 39 of the second arm 34 serve to grab the rim of the hole in the resilient material formed by the penetration of the second arm 34 into the second end 10 and thus securely anchor the second arm 34 into the cover 2.

Another embodiment of the invention is shown in FIG. 4. The fastener 30 is secured to the first end 10 by crimping the first arm 32 down over the inside surface 5 of the first end 8 to thereby form a secure connection. While in FIG. 3, the first end 8 has a terminal edge 12 in the form of a straight line, FIG. 4 shows a preferred feature of the invention wherein the first end 8 has an arcuate terminal edge 24 which forms an apex 22 through which the first arm 32 of the fastener is inserted or folded over. In this embodiment, buckling at the outer edges 19 is eliminated.

Referring the FIG. 5, the trough 4 may be molded or preformed in a shape in which the outer surface 6 of the trough 4 is substantially in the shape of the outer surface (e.g. outer radius) of the elbow joint. This construction is advantageous to the installer of the pipe cover because the cover 2 will more easily vest on the pipe joint enabling the installer to more efficiently bring the first end 8 and second end 10 in overlapping relationship.

Figure 6:
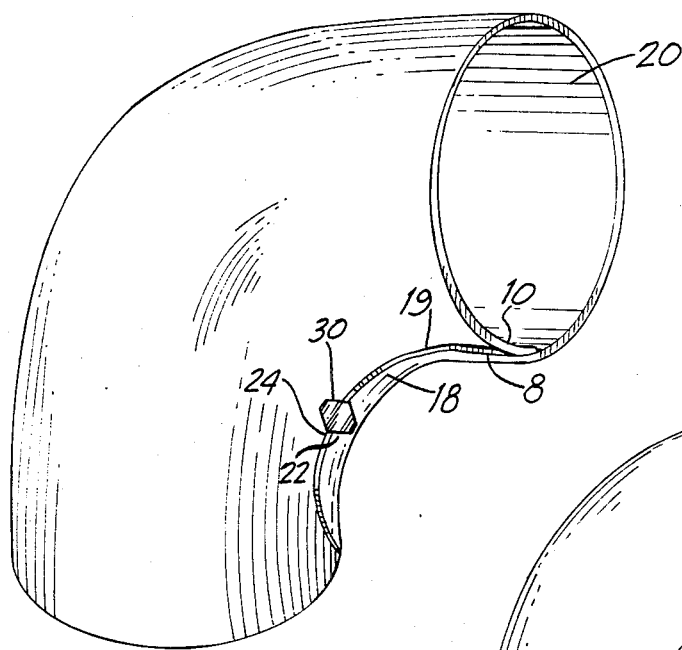
FIG. 6 is a perspective view of one embodiment of the cover of the invention secured by a fastener in the central portion of the top end having an arcuate terminal edge.
Figure 7:
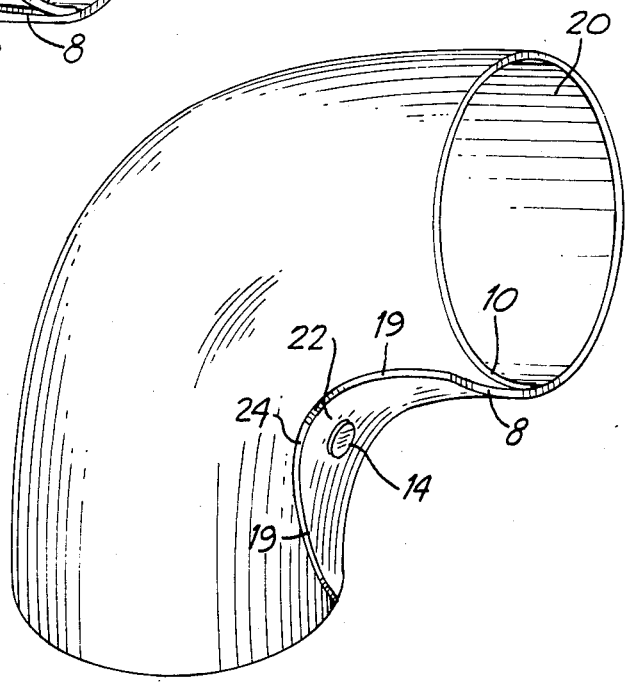
FIG. 7 is a perspective view of another embodiment of the cover of the invention secured by a threaded tack inserted through the overlapping top and bottom ends wherein the top end has an arcuate terminal edge.
Figure 9:
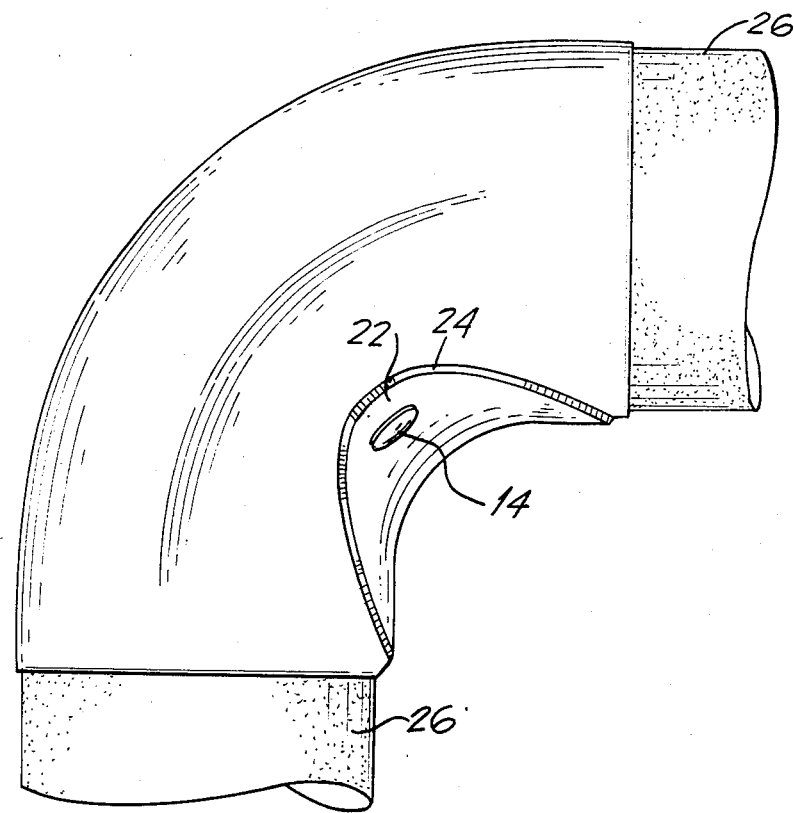
FIG. 9 is a side elevational view of a pipe cover of the invention in the operable position secured around pipe insulation.

When the first end 8 of the cover 2 and the second end 10 are placed in overlapping relationship and secured together in accordance with the invention, the cover 2 assumes the shape of the angled pipe joint. This is shown in FIGS. 6 and 7. More specifically, FIG. 6 shows the first end 8 overlapping the second end 10 and both ends secured in overlapping relationship by the fastener 30 which is attached to the first end 8 in the central portion 18 thereof. As shown in FIG. 6, the first end 8 has an arcuate shape terminal edge 24 forming an apex 22 in which the fastener 30 is secured. The arcuate terminal edge 24 enables the edges 19 of the first end 8 to rest flat against the second end 10 and thereby eliminates buckling which leads to moisture infiltration associated with known pipe covers. The overlapping relationship of the first end 8 and the second end 10 about the angled pipe joint causes hollows 20 to form for surrounding pipe insulation 26 which is secured about the pipes themselves (see FIG. 9).

FIG. 7 shows the same configuration as in FIG. 6 except that a threaded tack 14 is used as the means of securing the first end 8 to the second end 10. The threaded tack 14, as more particularly shown in FIG. 8A, comprises a head 15, a body having annular threads 17 terminating in a pointed end 16 which is capable of penetrating the resilient material when pressure is applied to the head 15.

The threaded tack 14 is inserted into the first end 8 in the apex 22 formed by the arcuate terminal edge 24 to thereby secure the first end 8 to the second end 10 and the cover 2 about the angled pipe joint.

Figure 8:
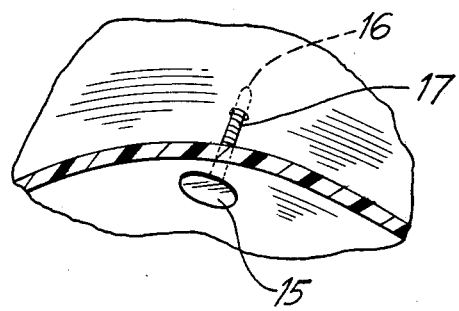
FIG. 8 is a side elevational view showing the threaded tack inserted through the top end and ready to be inserted into the bottom end at an acute angle with respect to the plane of the bottom end.
Figure 8A:
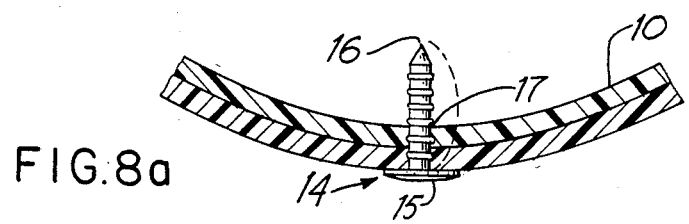
FIG. 8A is a cross-sectional view of the top and bottom ends secured by the threaded tack.

The tack 14 is first inserted into the first end 8. In accordance with the method of the invention, it is preferred to then drive the tack through the second end 10 at an acute angle with respect to the plane of the second end 10 as shown in FIG. 8. This enables the tack 14 to grab the rim of the hole formed in the second end 10 to more tightly draw the first end 8 about the second end 10. As the tack is inserted into the second end 10 at an acute angle, its path of penetration is in the form of an arc as shown in FIG. 8A. When completely inserted into the second end 10, the tack 14 is at about a 90° angle with respect to the plane of both the first end 8 and the second end 10. The arcuate path of the tack 14 as it penetrates into and through the second end 10 draws the first end 8 tightly over the second end 10 provide a secure fit.

Figure 11:
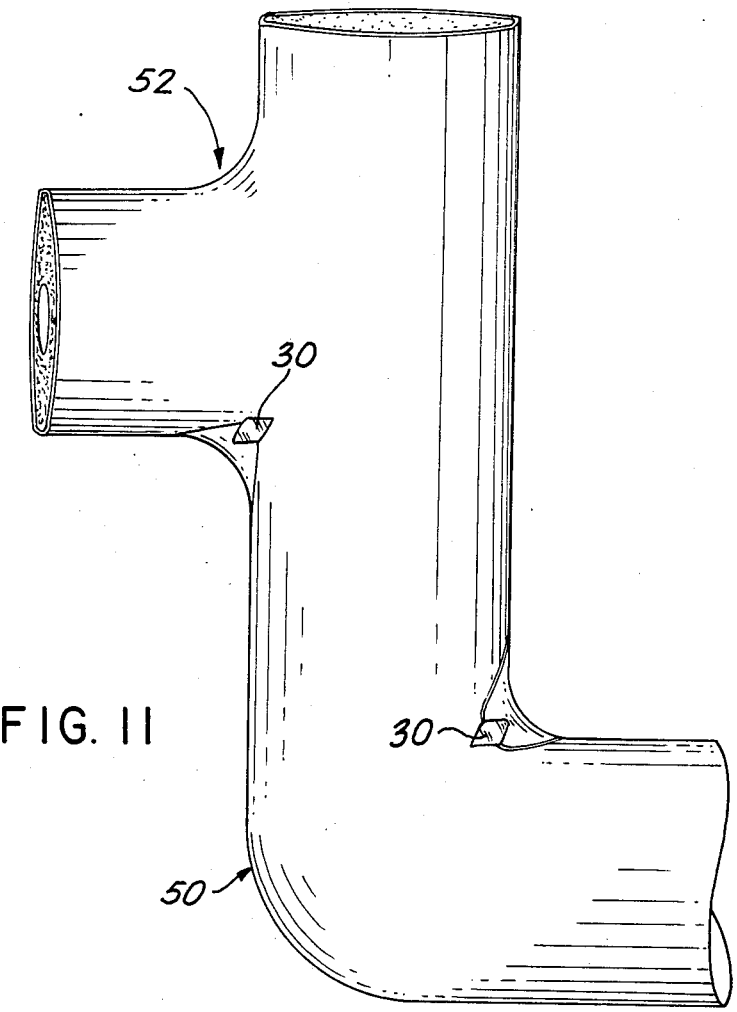
FIG. 11 is a side-elevational view of pipe covers of the invention in the operable position about an elbow joint and a tee joint.

It is to be understood that the embodiments of the invention described above can be used with a wide variety of angled pipe joints. As shown in FIG. 11 for example, the pipe covers of the invention may be fitted around, for example, an elbow joint 50 or a tee joint 52 using the securing means previously described.

As previously indicated, the single integral structure pipe cover of the present invention is preferably molded out of thermoplastics (e.g., polyvinyl chloride) in a manner which is well known to those skilled in the art. Other thermoplastic materials may be used in accordance with the present invention so long as they are resilient and flexible so that they can be molded in the trough-like shape described above with ends which may be placed about the inner radius of the angled pipe joint to provide a secure fit.

Variations and modifications of the embodiments described above within the spirit and scope of the invention would be apparent to those of ordinary skill in the art.

What I claim is:

1. In a pipe fitting cover for covering an angled pipe joint formed from a flexible resilient material as a single integral structure in a first elongated trough-like shape having opposed ends, said structure adapted to be folded into a second shape which is substantially the same shape as the angled pipe joint to be covered by the folding of the first of the opposed ends over the second end wherein the first end comprises a central portion and a terminal edge, the improvement comprising:

said first end having an arcuate shaped terminal edge forming an apex in the central portion whereby said first end has a substantially convex shape, and means solely in the apex of the central portion for securing the first end to the second end when the pipe cover is in the operable position wrapped around the angled pipe joint.

2. The pipe fitting cover of claim 1, wherein the securing means comprises a tack having at least one cover engageable ridge, said tack being inserted into the apex of the central portion of the first end and adapted to be inserted into a corresponding portion of the second end when the pipe cover is wrapped around the angled pipe joint, at least one of said ridges being in locking engagement with the rim of the holes formed by insertion of the tack into said first and second ends to thereby secure said pipe cover about the angled pipe joint.

3. The pipe fitting cover of claim 2, wherein the tack is inserted through the second end at an acute angle with respect to the plane of the second end.

4. The pipe fitting cover of claim 1, wherein the trough is substantially in the shape of the outside radius of the angled pipe joint.

5. The pipe fitting cover of claim 1, wherein the securing means comprises a fastener having a base and at least two spaced apart arms extending from the base, one of said arms being in engagement with the apex of the central portion of the first end and another of said arms adapted to be inserted into the second end when the pipe cover is wrapped around the angled pipe joint.

6. The pipe fitting cover of claim 5, wherein the one arm is folded about the inside surface of the first end of the cover.

7. The pipe fitting cover of claim 5, wherein said another arm extends from the base at an acute angle, whereby said another arm is insertable into the second end of the cover at an acute angle with respect to the plane of the second end of the cover.

8. The pipe fitting cover of claim 7, wherein said another arm comprises at least one cover engageable ridge whereby when said another arm is inserted through the second end of the cover within the hole formed therein, at least one of the ridges engaging the rim of the hole to thereby secure the another arm within the hole and the cover about the angled pipe joint.

9. The pipe fitting cover of claim 7, wherein the securing means comprises a fastener having a pair of opposed ends, a substantially flat base connecting said opposed ends, wherein one of said ends is affixed to the first end of the cover, the other of said ends having an arm extending from the base at an acute angle, said arm comprising a tapered body having a plurality of staggered cover engagable ridges and a piercing end for penetrating the second end of the cover whereby when said cover is placed about the angled pipe joint, the piercing end of the arm penetrates the second end of the cover to form a hole therein, at least one of said ridges engaging the rim of the hole to thereby secure the arm within the second end and the cover about the angled pipe joint.

10. The pipe fitting cover of claim 9, wherein the one end of the fastener is folded about the inside surface of the first end of the cover.

11. The pipe fitting cover of claim 10, wherein the angled pipe joint is an elbow joint or a tee joint.

12. A method of covering an angled pipe joint with a pipe fitting cover, said cover formed from a flexible resilient material as a single integral structure in a first elongated trough-like shape having opposed ends, said structure adapted to be folded into a second shape which is substantially the same shape as the angled pipe joint to be covered by the folding of the first of the opposed ends over the second end, wherein the first end has a central portion and an arcuate shaped terminal edge forming an apex in said central portion, said first end having a substantially convex shape, said method comprising:

(a) inserting through the apex of the first end sole means for securing the first end to the second end;
(b) placing said cover into fitting alignment with the angled pipe joint wherein the trough conforms to the outer radius of the angled pipe joint;
(c) placing the second end about the inner radius of the angled pipe joint;
(d) placing the first end over the second end; and
(e) driving the securing means through the second end to thereby secure the first end to the second end and the cover about the angled pipe joint.

13. The method of claim 12, wherein the securing means comprises a tack having at least one cover engageable ridge, said method further comprises driving the tack through the second end at an acute angle with respect to the plane of the second end wherein at least one of said cover engageable ridges engages the rim of the hole formed by the insertion of the tack into the second end to thereby draw the first end tightly over the second end.

14. The method of claim 12, wherein the trough is substantially in the shape of the outside radius of the angled pipe joint.

15. The method of claim 14, wherein the securing means comprises a tack having at least one cover engageable ridge, said method further comprises driving the tack through the second end at an acute angle with respect to the plane of the second end wherein at least one of the cover engageable ridges engages the rim of the hole formed by insertion of the tack into the second end to thereby draw the first end tightly around the second end.

* * * * *